United States Patent
Theising

[19]

[11] Patent Number: 5,903,956
[45] Date of Patent: May 18, 1999

[54] THREE-WHEEL PIVOT-CASTER ASSEMBLY

[75] Inventor: John L. Theising, St. Peters, Mo.

[73] Assignee: Emerson Electric Co., St. Louis, Mo.

[21] Appl. No.: 08/972,921

[22] Filed: Nov. 18, 1997

[51] Int. Cl.[6] .................................................. B60B 33/04
[52] U.S. Cl. ........................ 16/19; 16/30; 16/33; 16/34; 16/35 R
[58] Field of Search .................... 16/19, 32, 33, 16/30, 35 R, 34; 248/188.2, 188.6, 129; 280/43.14–43.17, 43.24, 189

[56] References Cited

U.S. PATENT DOCUMENTS

| | | |
|---|---|---|
| 79,571 | 7/1868 | Hewitt et al. . |
| 101,844 | 4/1870 | Elliott . |
| 623,157 | 4/1899 | Hunter ........................................ 16/19 |
| 654,776 | 7/1900 | Barber . |
| 823,468 | 6/1906 | Hendricks .................................. 16/32 |
| 1,426,328 | 8/1922 | Tiffany . |
| 1,485,880 | 3/1924 | Palmer . |
| 1,633,473 | 6/1927 | Bush . |
| 1,999,106 | 4/1935 | Muller ........................................ 16/34 |
| 2,563,919 | 8/1951 | Christensen .............................. 280/49 |
| 2,663,048 | 12/1953 | Ross, Jr. et al. ........................... 16/32 |
| 2,697,243 | 12/1954 | Shager ....................................... 16/32 |
| 2,729,843 | 12/1956 | Seek ........................................... 16/32 |
| 2,843,392 | 7/1958 | Simpkins .................................. 280/44 |
| 3,155,190 | 11/1964 | Borgman ................................... 16/32 |
| 3,175,641 | 3/1965 | Mihalik .................................... 182/15 |
| 3,269,774 | 8/1966 | Dobson .................................... 280/43 |
| 3,404,884 | 10/1968 | Sorenson .................................. 272/60 |
| 3,544,127 | 12/1970 | Dobson .................................... 280/43 |
| 4,249,282 | 2/1981 | Little ......................................... 16/32 |
| 4,417,738 | 11/1983 | Kendall .................................... 280/43 |
| 5,088,799 | 2/1992 | Redmon et al. .......................... 16/30 |
| 5,344,169 | 9/1994 | Pryor et al. .......................... 280/47.35 |
| 5,347,682 | 9/1994 | Edgerton, Jr. ............................. 16/34 |
| 5,348,326 | 9/1994 | Fullenkamp et al. .................... 280/43 |

*Primary Examiner*—Chuck Y. Mah
*Attorney, Agent, or Firm*—Arnold, White & Durkee

[57] ABSTRACT

A three-wheel pivot-caster assembly that provides mobility for a power tool is described. The pivot-caster assembly includes a first frame assembly with two wheels and a second frame assembly that has a caster assembly which includes a swivel wheel. The first and second frame assemblies may be adjusted to accommodate power tools of various sizes. Additionally, a "stopping" mechanism is provided to maintain the swivel caster in its set position when the power tool is lifted. A straight line action clamp mechanism with locking feature prevents accidental actuation of the swivel caster when the tool is lifted or used over an uneven surface.

22 Claims, 4 Drawing Sheets

THREE-WHEEL PIVOT-CASTER ASSEMBLY

BACKGROUND OF THE INVENTION

1. Field of the Invention

The invention relates in general to the field of power tools and, more particularly, to caster assemblies for power tools. Specifically, the invention relates to a three-wheel pivot-caster assembly that provides mobility for a power tool.

2. Description of the Related Art

Power tools have a variety of uses, including the cutting of wood pieces, and often may need to be moved from a storage area to a given work area. Wheel assemblies used to give mobility to a power tool need to be able to adapt to the various tool sizes and be easily activated/deactivated. Some conventional caster assemblies require various frame assembly welds to be adaptable to a variety of tools. One conventional assembly uses a wood frame, which may have a lower reliability due to the possibility of the failure of the wood frame. Also, conventional prior art caster assemblies can become accidentally mobile by lifting the unit, or moving the unit over a low area on the floor.

In some assemblies, wheel brakes apply force to a wheel tread, thereby preventing movement. Brake reliability, however, is often dependent on how tightly the brake knobs are turned, which may be difficult to control. Use of a wheel brake mechanism also fails to provide a visual determination of whether or not the brakes are engaged. Thus, it would be beneficial to have a pivot-caster assembly that is capable of overcoming the shortcomings of conventional methods.

SUMMARY OF THE INVENTION

The invention relates to a three-wheel pivot-caster assembly that provides mobility for a power tool. The pivot-caster assembly includes a first frame assembly with two wheels and a second frame assembly that has a caster assembly which includes a swivel wheel. The first and second frame assemblies may be adjusted to accommodate power tools of various sizes. Additionally, a "stopping" mechanism is provided to prevent accidental actuation when the power tool is lifted.

BRIEF DESCRIPTION OF THE DRAWINGS

Other objects and advantages of the invention will become apparent upon reading the following detailed description and upon reference to the drawings in which.

Figure 1:
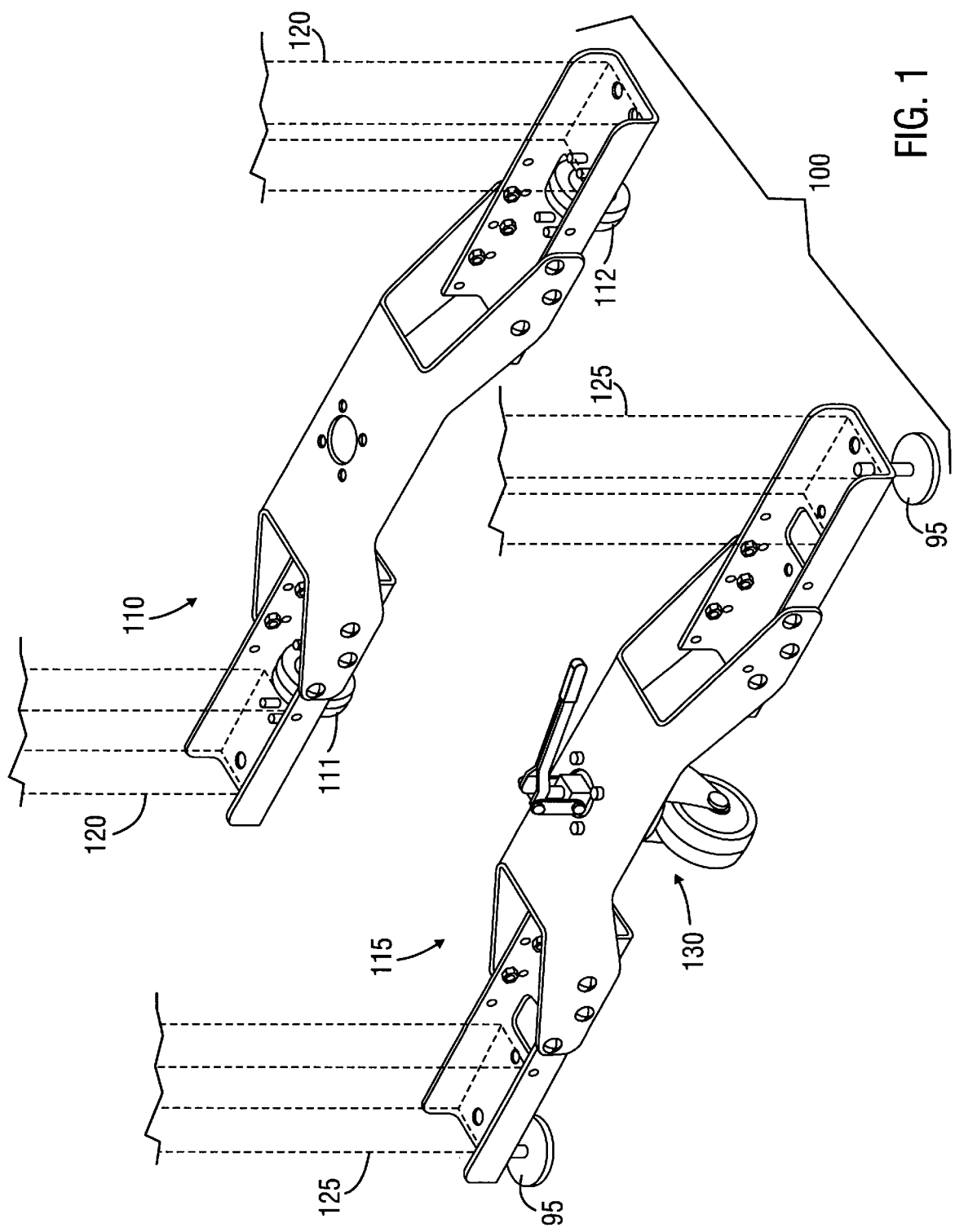
FIG. 1 is a perspective of a three-wheel pivot-caster assembly in accordance with the invention.

While the invention is susceptible to various modifications and alternative forms, specific embodiments have been shown by way of example in the drawings and are described in detail. It should be understood, however, that the description herein of specific embodiments is not intended to limit the invention to the particular forms disclosed. On the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below as they might be employed in a three-wheel, pivot-caster assembly for a power tool. In the interest of conciseness, not all features of an actual implementation are described in this specification. It will, of course, be appreciated that in the development of any actual embodiment, numerous implementation-specific decisions must be made to achieve the developer's specific goals, such as compliance with system-related and business-related constraints. Moreover, it will be appreciated that even if such a development effort might be complex and time-consuming, it would nevertheless be a routine undertaking for one of ordinary skill having the benefit of this disclosure.

Overview

FIG. 1 illustrates the implementation of a three-wheel pivot-caster assembly 100 in according to the invention with a power tool (not shown). The power tool could be any large power tool (e.g., a table saw) that needs to be moved from one location to another. As shown, the pivot-caster assembly 100 consists of two separate frame assemblies 110, 115. Each of the frame assemblies 110, 115 may be constructed using the same part configuration. Though the structure of frame assembly 110 may be identical to the structure of frame assembly 115, the implementations of the frame assemblies may be different. For example, frame assembly 110 is connected to a leg assembly 120 of the power tool and rests on two stationary wheels 111, 112. In contrast, frame assembly 115 is coupled to the leg assembly 125 on the opposite side of the power tool some predetermined distance away from frame assembly 110. The frame assembly 115 rests on a caster wheel assembly 130 when pivot-caster assembly 100 is in an engaged position. If pivot-caster assembly 100 is not engaged, frame assembly 115 rests on a ground surface (e.g., a floor), or on leveling feet 95, providing the stability needed during operation of the power tool.

Specific Embodiments

Figure 2:
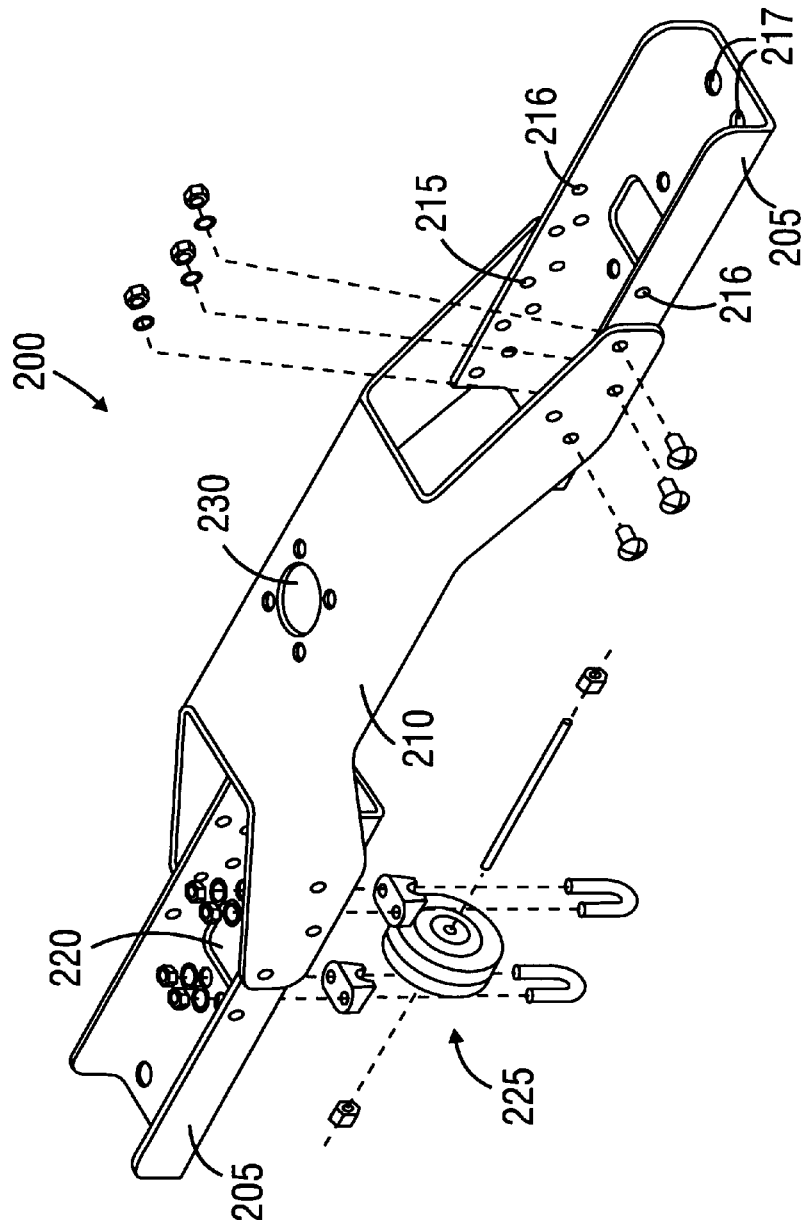
FIG. 2 is an expanded view of a frame assembly.

FIG. 2 is an enlarged view of a frame assembly 200 which can be used as either frame assembly 110 or 115 of FIG. 1. Frame assembly 200 includes two identical end portions 205 and a center portion 210 which can be made from sheet metal. The end portions 205 are constructed such that they include multiple apertures 215 on the side of end portion 205, some of which are used to secure end portions 205 to center portion 210. As shown in FIG. 2, the number of apertures in end portions 205 is greater than the number of apertures needed to secure end portions 205 to center portion 210. The additional apertures on the side of end portion 205 enable it to be adapted to fit power tools of various sizes. For example, a small power tool may use outer holes 216 to secure end portions 205 to center portion 210. End portions 205 also include leg mounting apertures 217 for mounting end portions 205 to the leg assembly of a power tool (not shown). Leveling feet 95 of FIG. 1 may be employed to connect the frame assembly to the leg set.

Each end portion 205 also includes a set of wheel holes enabling a wheel 225 to be securely fastened. The wheel 225 is a stationary rubber wheel that is in constant contact with a surface (e.g., a floor). The frame assembly 200 also includes center portion 210 with opening 230 and surrounding apertures. A caster assembly (not shown) may be coupled into opening 230 and secured with the surrounding apertures as shown in frame assembly 115 of FIG. 1.

Figure 3A:
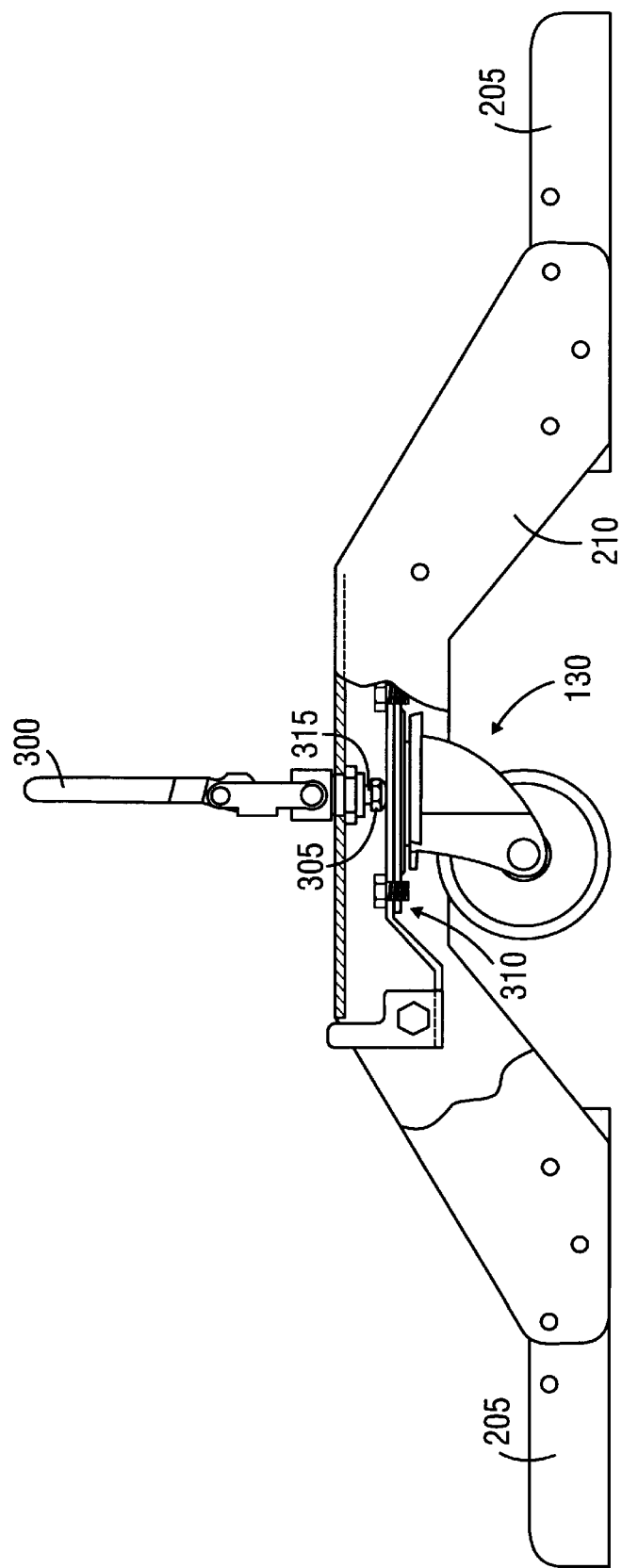
FIG. 3A and 3B illustrate the two positions of the caster assembly of FIG. 1.
Figure 3B:
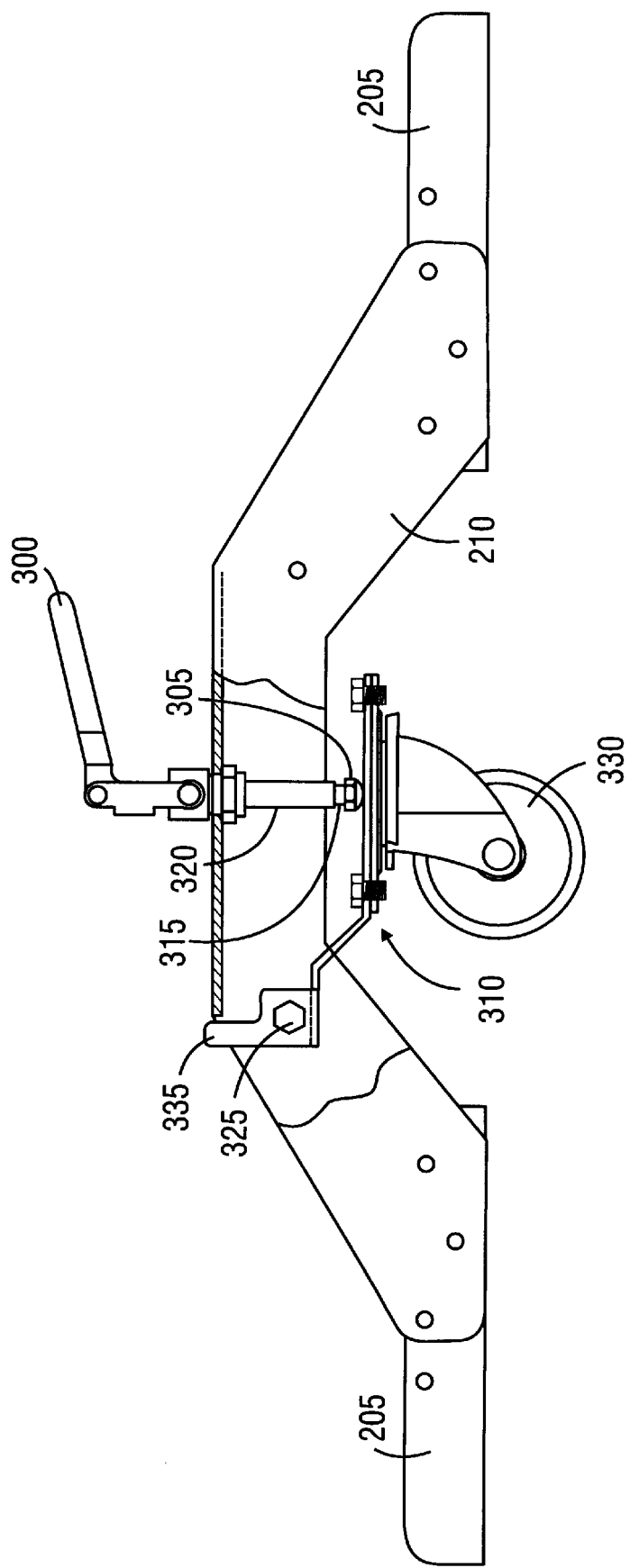

FIGS. 3A and 3B illustrate close-up views of center portion 210 with caster assembly 130. Caster assembly 130 includes an actuation lever 300 that has an adjustable bolt 305 for engaging a hinge plate 310. The adjustable bolt 305 can be rotated in a selected direction to increase/decrease the height of rod 315. Adjustment of rod 315 allows frame assembly 200 to be adjusted to accommodate any height differentials between the two frame assemblies used in pivot-caster assembly 100. For example, if frame assemblies 110, 115 are placed on a surface that is not flat, adjustable bolt 305 could be used to accommodate the height differential between the two frame assemblies such that the power tool supported by the assemblies is leveled.

When the pivot-caster assembly is in an unengaged position (i.e., the position shown in FIG. 3A), caster assembly 130 is retracted within frame assembly 210 such that the weight of the power tool (not shown) attached to frame assembly 210 is supported principally by end portions 205, making it stationary. In contrast, when actuation lever 300 is in the engaged position, as shown in FIG. 3B, caster assembly 130 is fully extended such that the power tool is mobile. Placing actuation lever 300 in the engaged position (see FIG. 3B) extends rod 320, causing adjustable bolt 305 to place a downward force on hinge plate 310. The downward force causes hinge plate 310 to pivot around hinge bolt 325 to an engaged position in which hinge plate 310 is fully extended.

When hinge plate 310 is fully extended, the swivel wheel 330 of caster assembly 130 is the only portion of frame assembly 200 that is on the surface, making the assembly mobile. The use of actuation level 300 visibly indicates if the pivot-caster assembly is mobile. The caster assembly 130 also includes a hinge plate stop 335. The hinge plate stop 335 of FIG. 3B is designed such that if frame assembly 115 of FIG. 1 is lifted off the ground surface, hinge 310 of FIG. 3B cannot rotate beyond its intended range. This feature allows the wheel to remain in its set position when the tool is returned to the ground surface. The hinge plate stop 335 provides an added level of stability to the assembly.

One skilled in the art will appreciate that a three-wheel pivot-caster assembly in accordance with the invention allows for a power tool to be securely mounted, while providing mobility when needed. The three-wheel design with a single lift swivel wheel allows for quick activation of the caster assembly. The three wheel caster assembly incorporates an actuation lever that is a modified straight line action clamp mechanism, that can be locked in the extended or retracted position. This prevents the wheel from accidentally being engaged if the tool is lifted, or is placed over a low area in the floor, and essentially assures that the wheel remains in its set position under all surface conditions. The use of a bolt at the end of the actuation lever provides a height adjustment to accommodate for height differentials present on a surface.

The movement of the actuation lever makes it visually obvious that the tool is in its mobile position, which lessens the possibility that the tool will be used in its mobile position. The two fixed casters are mounted on threaded (or smooth) shafts with locknuts (or retaining rings) on each side of the caster. When adjusted, the locknuts minimize the space between the wheel and frame and prevent any sideways movement of the tool during use. The three-wheel pivot-caster frame assembly in accordance with the invention also allows for easy attachment of the casters to a variety of power tools.

It will be appreciated by those of ordinary skill in the art having the benefit of this disclosure that numerous variations from the foregoing illustration will be possible without departing from the inventive concept described herein. Accordingly, it is the claims set forth below, and not merely the foregoing illustration, which are intended to define the exclusive rights of the invention.

What is claimed is:

1. A three-wheel, pivot-caster assembly for power tool, comprising:
   a first frame assembly adapted to be coupled to a first end of said power tool, said first frame assembly having first and second stationary wheels; and
   a second frame assembly adapted to be coupled to a second end of said power tool, said second frame assembly having: a caster wheel, and means for engaging said caster wheel in an extended position and disengaging said caster wheel in a retracted position.

2. The assembly of claim 1 wherein said frame assemblies are made from sheet metal.

3. The assembly of claim 1 wherein said first and second wheels are made from rubber or plastic material.

4. The assembly of claim 1 wherein said frame assemblies further comprise a center portion and end portions.

5. The assembly of claim 4 where said end portions are of the same configuration.

6. The assembly of claim 4 wherein said end portions are adapted to be coupled to a leg assembly of said power tool.

7. The assembly of claim 1 wherein said second frame assembly is adjustable in respect to said first frame assembly to accommodate for the size of said power tool.

8. The assembly of claim 1, further comprising means for locking the position of said caster wheel.

9. A three-wheel pivot-caster assembly for a power tool, comprising:
   a first frame assembly adapted to be coupled to a first end of said power tool, said first frame assembly having a first and a second stationary wheel fastened in a first and a second aperture of said first frame assembly;
   a second frame assembly adapted to be coupled to a second end of said power tool, said second frame assembly having a caster wheel assembly comprising:
   a hinge plate coupled to said second frame;
   a swivel wheel attached to said hinge plate;
   a lever mounted on said second frame; and
   a rod having a first end coupled to said lever and a second end for pushing said hinge plate into a selected position.

10. The assembly of claim 9 wherein said frame assemblies further comprise a center portion and end portions, said end portions for coupling to a leg assembly of said power tool.

11. The assembly of claim 9 wherein said frame assemblies are made from sheet metal.

12. The assembly of claim 9 wherein said first and second wheels are rubber or plastic wheels.

13. The assembly of claim 9 further comprising an adjustable bolt rotatively coupled along the axis of the second end of said rod.

14. The assembly of claim 13 wherein said adjustable bolt is used to make said second frame assembly parallel to said first frame assembly.

15. The assembly of claim 9 wherein said second frame assembly is adjustable in respect to said first frame assembly to accommodate the size of said power tool.

16. A three-wheel metal pivot-caster assembly for a power tool, comprising:
   a first frame assembly adapted to be coupled to a first end of said power tool, comprising:
   a first and a second end piece, each of said end pieces having an aperture;

a center piece having an aperture and adapted to be coupled to said first and second end pieces;

a first and a second stationary wheel securely fastened in said apertures of said first and second end pieces;

a second frame assembly adapted to be coupled to a second end of said power tool, said second end opposite said first end of said power tool, said second frame assembly including a caster wheel assembly, said caster wheel assembly comprising:

a lever mounted on said second frame assembly, said lever having a first end and a second end;

an adjustable bolt coupled to said second end of said lever;

a hinge plate having a first surface, a second surface, and a hinge stop, said hinge plate coupled to said second frame assembly, and movable by engaging said first end of said lever to adjust the force exerted by said adjustable bolt on said first surface of the hinge plate; and a swivel wheel coupled to said second surface of said hinge plate.

17. The assembly of claim 16 wherein said first and second wheels are rubber or plastic wheels.

18. The assembly of claim 16 wherein said adjustable bolt is used to make said second frame assembly parallel to said first frame assembly.

19. The assembly of claim 16 wherein said second frame assembly is adjustable in respect to said first frame assembly to accommodate the size of said power tool.

20. The assembly of claim 16 wherein said first and second frame assemblies are of the same configuration.

21. The assembly of claim 16, further comprising a locking mechanism for locking the position of the lever.

22. The assembly of claim 16, wherein said lever is a modified straight line action clamp mechanism, for locking the position of the lever.

* * * * *